(12) United States Patent
Chen et al.

(10) Patent No.: US 12,539,616 B2
(45) Date of Patent: Feb. 3, 2026

(54) SAMPLING ROBOT, ROBOT SYSTEM FOR GOODS SAMPLING AND DETECTION AND DETECTION METHOD

(71) Applicants: TSINGHUA UNIVERSITY, Beijing (CN); NUCTECH COMPANY LIMITED, Beijing (CN)

(72) Inventors: Zhiqiang Chen, Beijing (CN); Jin Cui, Beijing (CN); Bin Hu, Beijing (CN); Jinlu Li, Beijing (CN); Shiqiang Wang, Beijing (CN); Chunhui Liu, Beijing (CN); Mengchen Liu, Beijing (CN)

(73) Assignees: TSINGHUA UNIVERSITY, Beijing (CN); NUCTECH COMPANY LIMITED, Beijing (CN)

( * ) Notice: Subject to any disclaimer, the term of this patent is extended or adjusted under 35 U.S.C. 154(b) by 1077 days.

(21) Appl. No.: 17/560,666

(22) Filed: Dec. 23, 2021

(65) Prior Publication Data

US 2022/0203546 A1    Jun. 30, 2022

(30) Foreign Application Priority Data

Dec. 31, 2020    (CN) .......................... 202011637305.5
Jan. 25, 2021    (CN) .......................... 202110097146.2

(51) Int. Cl.
*B25J 9/16*    (2006.01)
*C12Q 1/06*    (2006.01)
(Continued)

(52) U.S. Cl.
CPC .............. *B25J 9/1697* (2013.01); *C12Q 1/06* (2013.01); *F25D 25/005* (2013.01);
(Continued)

(58) Field of Classification Search
CPC ........ B25J 9/1697; C12Q 1/06; F25D 25/005; G01N 35/00871; G01N 35/0099; G06Q 10/087
See application file for complete search history.

(56) References Cited

U.S. PATENT DOCUMENTS 8,983,647 B1 *  3/2015  Dwarakanath ....... G05D 1/0297
                                                    700/216
10,268,984 B1 *  4/2019  Ramoji ................ G06Q 10/087
(Continued)

FOREIGN PATENT DOCUMENTS

CN    201931461 U    8/2011
CN    104865279 A    8/2015
(Continued)

OTHER PUBLICATIONS

CN202110097146.2 first office action and search report, issued on Apr. 23, 2024.

*Primary Examiner* — Kyle O Logan
(74) *Attorney, Agent, or Firm* — IPro, PLLC

(57) ABSTRACT

A sampling robot, a robot system for goods sampling and detection and a detection method are disclosed. The image collection unit takes photos of a sample. The refrigeration unit stores the sample at a preset temperature. The biometric information collection unit collects the biometric information of the operator. The intelligent mobile unit moves according to a planned path. The control unit provides destination information to the intelligent mobile unit and judges whether the current sample is a sample to be detected, and judges the biometric information of the operator.

11 Claims, 1 Drawing Sheet

(51) Int. Cl.
  *F25D 25/00* (2006.01)
  *G01N 35/00* (2006.01)
  *G06Q 10/087* (2023.01)

(52) U.S. Cl.
  CPC ... *G01N 35/00871* (2013.01); *G01N 35/0099* (2013.01); *G06Q 10/087* (2013.01)

(56) References Cited

U.S. PATENT DOCUMENTS

| | | | | |
|---|---|---|---|---|
| 2002/0026805 | A1* | 3/2002 | Takahashi | B60H 1/3232 62/239 |
| 2007/0150373 | A1* | 6/2007 | Kuo | B60P 3/20 705/28 |
| 2014/0165614 | A1* | 6/2014 | Manning | F25D 29/00 62/62 |
| 2015/0203297 | A1* | 7/2015 | Manning | F25D 13/06 700/218 |
| 2015/0269521 | A1* | 9/2015 | Knapp | G06Q 10/08355 705/338 |
| 2017/0082335 | A1* | 3/2017 | Jin | H04Q 9/00 |
| 2018/0058739 | A1* | 3/2018 | Zou | F25B 49/00 |
| 2019/0041868 | A1* | 2/2019 | Cantrell | G06Q 30/0635 |
| 2019/0213532 | A1* | 7/2019 | Brightwell | G06Q 30/0637 |
| 2019/0242716 | A1* | 8/2019 | N | G01C 21/3469 |
| 2019/0310646 | A1* | 10/2019 | DeJarnette | G06Q 10/087 |
| 2019/0311322 | A1* | 10/2019 | DeJarnette | H04W 4/021 |
| 2020/0005237 | A1* | 1/2020 | Simons | G06Q 10/0832 |
| 2020/0317445 | A1* | 10/2020 | Schultz | B65G 1/1371 |
| 2020/0410801 | A1* | 12/2020 | Rahilly | G16H 40/20 |
| 2021/0070135 | A1* | 3/2021 | Andrade Dias | H02J 7/0024 |
| 2021/0107159 | A1* | 4/2021 | Goto | B25J 9/1664 |
| 2021/0114810 | A1* | 4/2021 | Matsuoka | B65G 1/1375 |
| 2021/0120185 | A1* | 4/2021 | Etou | H04N 7/185 |
| 2021/0270858 | A1* | 9/2021 | Imai | G01N 1/2202 |
| 2021/0364226 | A1* | 11/2021 | Park | G05B 13/027 |
| 2022/0055452 | A1* | 2/2022 | Chen | B60H 1/2227 |
| 2022/0089001 | A1* | 3/2022 | Tebib | F25D 17/06 |

FOREIGN PATENT DOCUMENTS

| | | |
|---|---|---|
| CN | 106096813 A | 11/2016 |
| CN | 110688936 A | 1/2020 |
| WO | 2017115385 A2 | 7/2017 |

* cited by examiner

SAMPLING ROBOT, ROBOT SYSTEM FOR GOODS SAMPLING AND DETECTION AND DETECTION METHOD

CROSS-REFERENCE TO THE RELATED APPLICATIONS

The present application is based upon and claims priority to Chinese Patent application No. 202110097146.2, filed on Jan. 25, 2021, and No. 202011637305.5, filed on Dec. 31, 2020, the entire contents of which are incorporated herein by reference.

TECHNICAL FIELD

The disclosure herein relates to the field of robots, in particular to a sampling robot, a robot system for goods sampling and detection and a detection method.

BACKGROUND

At present, in the customs inspection process, some commodities including refrigerated and chilled commodities must be sampled and detected. At present, the inspection of refrigerated and/or chilled commodities is performed on a special cold chain platform in the customs inspection area. Most of these platforms are open spaces, and the inspection is mainly done manually. Therefore, the sampling of refrigerated and/or chilled commodities is basically done by manual operation, including manual bagging, manual installation and sealing, and manual transportation to the detection laboratory. Such an operation mode has the following disadvantages:

First, there are supervision and management risks in open areas. The inspection site is an open operation area, lacking technical means for personnel information verification, and unable to effectively control personnel access. Various people can enter the operation area, and there are risks of stealing goods and changing goods.

Second, refrigerated and chilled commodities (such as some drugs and foods) cannot be exposed to the ambient air with a temperature not suitable for refrigerated goods for a long time. At the same time, as the platform is an open platform, there is a certain risk for the samples to be placed in the platform cabinet. Therefore, after the on-site inspection, the customs inspection officer must immediately send the samples to the detecting room for storage, which will have a certain impact on the inspection efficiency.

Third, the informatization support is insufficient, and the operation is mainly done manually, which are not conducive to further improving the efficiency of supervision and management.

SUMMARY

In view of the above defects or disadvantages in the prior art, it is desirable to provide a sampling robot, a robot system for goods sampling and detection and a detection method.

In a first aspect, a sampling robot is provided, which comprises:
an image collection unit for photographing a sample and sending a sample image collected to a control unit;
a refrigeration unit for storing the sample at a preset temperature;
a biometric information collection unit for collecting biometric information from an operator and sending the biometric information to the control unit;
an intelligent mobile unit for receiving destination information from a remote management center or the operator, performing path planning according to the destination information and obstacle information, and moving according to a planned path; and
the control unit for providing the destination information to the intelligent mobile unit, for identifying a type of the sample image collected through an image recognition algorithm, comparing the identified type with declared commodity type, and if consistent, judging that a current sample is a sample to be detected; and for judging whether the biometric information of the operator is biometric information of an operator with operation authority, and if not, prohibiting the operator from opening the refrigeration unit.

In a second aspect, a robot system for goods sampling and detection is provided, which comprises the robot as described above and a remote management center, Wherein the remote management center is for receiving information from a communication module of the robot and sending declaration information to the robot, and the remote management center also sends at least one of the following two kinds of information to the robot: the biometric information of an operator with operation authority and the destination information.

In a third aspect, a method for sampling and detection using a sampling robot is provided, which comprises:
photographing a sample, identifying a type of a sample image collected through an image recognition algorithm, comparing the identified type with declared commodity type, and if consistent, judging that a current sample is a sample to be detected;
collecting biometric information of an operator and determining whether the biometric information of the operator is biometric information of an operator with operation authority;
if the current sample is not the sample to be detected or the operator is not an operator with operation authority, prohibiting the operator by the sampling robot from putting the current sample into the refrigeration unit of the sampling robot;
after the sample is put into the refrigeration unit, saving the sample at a preset temperature by the refrigeration unit; and
by the sampling robot, receiving destination information from a remote management center or the operator, performing path planning according to the destination information and obstacle information, and moving according to a planned path.

According to the technical solutions provided in the embodiments of the present application, the sampling robot is mainly used for operators such as customs on-site inspection personnel. It integrates the functions of sample collection and storage as well as the personnel identification function, and thus can better serve the inspection personnel, assist them in completing the task of manual inspection on the inspection site, reduce the labor intensity of personnel, and avoid the disadvantage of repeated labor of operators such as customs personnel. In addition, the robot improves the informatization level of inspection management.

BRIEF DESCRIPTION OF FIGURES

Other features, objects and advantages of the present application will become more apparent by reading the detailed description of the non-limiting embodiments with reference to the following drawings.

Figure 1:
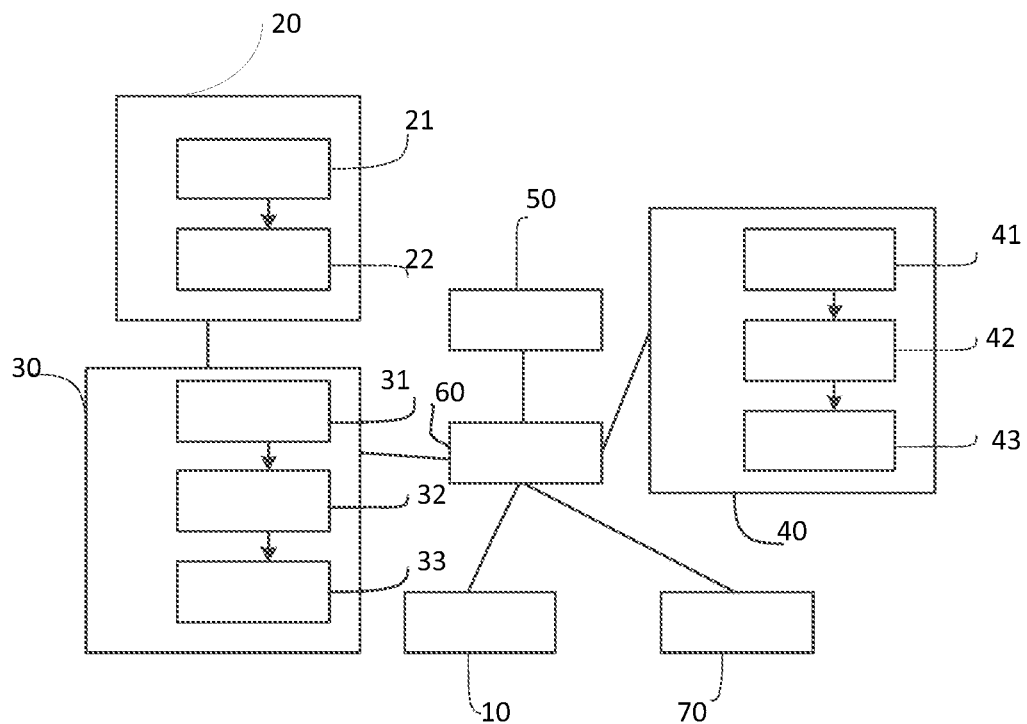
FIG. 1 is a schematic diagram of the structure of a sampling robot in the present embodiment.

The reference numbers in the figures are listed as below: 1—Robot, 2—remote management center 2, 3—operator, 4—detection center 4, 10—image collection unit, 20—detection module 20, 21—temperature detection module, 22—gas detection module, 30—refrigeration unit, 31—freezer, 32—temperature setting module, 33—weight detection module 33, 40—intelligent mobile unit 40, 41—sensing module 41, 42—navigation control unit, 43—motion module, 50—communication module, 60—control unit, 70—biometric information collection unit.

DETAILED DESCRIPTION

The present application will be further described in detail below in conjunction with the accompanying drawings and embodiments. It should be understood that the specific embodiments described herein are only used to explain the relevant invention and not to limit the present invention. It should also be noted that, for ease of description, only parts relevant to the present application are shown in the drawings.

It should be noted that the embodiments and the features in the embodiments in the present application can be combined with each other without conflict. The present application will be described in detail below with reference to the accompanying drawings and in conjunction with the embodiments.

Referring to FIG. 1, the present embodiment provides a sampling robot, which comprises:

- an image collection unit 10 for photographing a sample and sending a sample image collected to a control unit;
- a refrigeration unit 30 for storing the sample at a preset temperature;
- a biometric information collection unit 70 for collecting biometric information from an operator and sending the biometric information to the control unit;
- an intelligent mobile unit 40 for receiving destination information from a remote management center or the operator, performing path planning according to the destination information and obstacle information, and moving according to a planned path; and
- the control unit 60 for providing the destination information to the intelligent mobile unit, for identifying a type of the sample image collected through an image recognition algorithm, comparing the identified type with declared commodity type, and if consistent, judging that a current sample is a sample to be detected; and for judging whether the biometric information of the operator is the biometric information of an operator with operation authority, and if not, prohibiting the operator from opening the refrigeration unit.

The sampling robot in the present embodiment is mainly used for operators such as customs on-site inspection personnel. It integrates the functions of sample collection and storage as well as the personnel identification function, and thus can better serve the inspection personnel, assist them in completing the task of manual inspection on the inspection site, reduce the labor intensity of personnel, and avoid the disadvantage of repeated labor of operators such as customs personnel. In addition, the robot improves the informatization level of inspection management.

The sampling robot in the present embodiment is preferably applied to the field of customs sample inspection, such as the inspection of chilled or frozen products. The sampling robot comprises the image collection unit 10 for collecting an image of a sample obtained, which facilitates a preliminary judgment on the sample through the sampling robot. Specifically, the image collection unit 10 identifies the collected image, and determines the type information of the current sample. More specifically, the collected sample images are compared and trained through a pre-established picture library to determine the type of the current sample, and then the identified type is compared with the declared type. For example, the current sample is identified as hairtail through image collecting and identifying, and then the hairtail is compared with the declared type name. If the declared type name is also hairtail, it is judged that the current sample is the sample to be detected.

The refrigeration unit 30 is also provided to store the sampled samples at a preset temperature. At the same time, the operator is identified by the biometric information collection unit 70 to judge whether the current operator is an operator with operation authority or not. If not, the current operator is not permitted to operate the robot; for example, the current operator is not permitted to open the door of freezer to put in and take out a sample. The biometric information may include one or more of face information, fingerprint, voiceprint and iris.

The sampling robot in the present embodiment also comprises the intelligent mobile unit 40, which can perform path planning and move according to the corresponding destination information and obstacles, and transport the sample to the corresponding laboratory for further inspection.

Further, the sampling robot also comprises a detection unit 20 for performing preliminarily detection on the sample and judging whether the sample has a deterioration risk.

The sampling robot in the present embodiment comprises the detection module 20, which performs preliminarily detection and judgment on the sample, compares it with the description of the sample provided, and preliminarily identifies the sample to be submitted for inspection, including identifying whether the type of sample is the declared type, whether the quality of the sample has changed, etc. The preliminary identification of the sample saves time of operators. The sample may be chilled or frozen goods samples.

Further, the detection module 20 comprises at least one of the following modules:

- a temperature detection module 21 for performing temperature detection on the sample, judging whether a temperature of the current sample is within a preset threshold, and if not, determining that the sample does not meet goods storage conditions; and
- a gas detection module 22 for performing gas detection on the sample, judge whether the sample has gas generated due to the deterioration of the goods, and if so, determining that the sample has a deterioration risk.

In the present embodiment, the sampling robot is used to determine whether the sample obtained is deteriorated or whether the storage conditions of the sample are qualified. If the sample is at risk of deterioration, the laboratory personnel need to be reminded. Specifically, it is determined by detecting the temperature and gas of the sample. The temperature is detected by infrared thermal imaging equipment or temperature sensor. If the temperature is too high, it indicates that the sample does not meet the storage conditions of the goods; or if there is gas generated due to the deterioration of the goods, such as sulfide gas, methane, ammonia, etc., it indicates that the current sample is at risk of deterioration. If abnormal results come from the above steps, i.e. the sample does not meet the description or the sample has a deterioration risk, a further alarm is generated, and the personnel are informed for further operation.

Further, the refrigeration unit 30 comprises:
a freezer 31 for storing samples and being opened or closed according to a judgment result of the biometric information;
a temperature setting module 32 for setting and adjusting a temperature in the freezer as required; and
a weight detection module 33 disposed in the freezer, for calculating a weight of the sample currently put into and taken out of the freezer, and judging whether the weight of the sample put into the freezer is consistent with the declaration information.

In the present embodiment, by further providing the refrigeration unit, the sample is stored and its weight is calculated. By calculating the weight of the sample, it is further determined whether the sampling meets the declaration requirements, that is, the sample is further identified, and the information such as the weight of each sample put into and taken out of the freezer is calculate and recorded.

Further, the intelligent mobile unit 40 comprises:
a sensing module 41 for detecting an obstacle on a travel path of the robot and sending obstacle information to a navigation control unit;
the navigation control unit 42 for receiving destination information, receiving obstacle information of the sensing module, performing path planning according to the destination information and obstacle information, and controlling a movement mode of a motion module; and
the motion module 43 for receiving a signal from the navigation control unit to move forward or backward or turn.

The robot in the present embodiment further comprises the intelligent mobile unit. The robot can move freely, obtain samples and transport them to the corresponding laboratory. Moreover, the robot can also return to the corresponding charging point for charging when the power of the robot is insufficient. Specifically, the robot comprises the navigation control module, and determines the moving path through the navigation control module and further controls the motion module to move. The motion module comprises a driving wheel device, a driven wheel device, a damping device, etc. The intelligent mobile unit also comprises the sensing module to detect the obstacle information and determines the path through the obstacle information. The functions of navigation and positioning, path planning, mobile walking, etc. are completed by the navigation control unit.

Further, the image collection unit 10 is for photographing and storing the operation process of the operator and uploading it to the control unit.

The sampling robot provided by the present embodiment also has the ability of video monitoring. The image collection unit captures and stores the operation process of the operator, so as to facilitate supervision of the operator's operation, inspection of the operator's action by the supervisor, and backtracking and query of the whole collection and operation process. All operations of the robot on the travel path may be photographed. Alternatively, it may be controlled to photograph after the freezer is opened, and the operation of the operator on the sample may be recorded for subsequent check.

Further, the robot also comprises a power source management unit comprising a power source module and an electric quantity management module.

The power source module is for supplying power to the robot.

The electric quantity management module is for detecting the electric quantity of the power source module in real time. When the electric quantity of the power source module is lower than a preset value, the electric quantity management module controls the robot to stop working and return to a preset area for charging.

In the present embodiment the robot also comprises the power source management unit, which can detect the electric quantity in real time while supplying power to the sampling robot. When the electric quantity is lower than the preset value, the power source management unit timely controls the robot to stop working and return to the preset area for charging. The low electric quantity value can be set as a threshold range, and when the electric quantity is lower than a first threshold, an alarm will be given; the robot sends the sample to the nearest processing point and then returns to the charging point for charging; when the electric quantity is lower than a second threshold, the power source management unit directly controls the robot to stop working and charge. The specific working mode can be determined according to the actual situation.

Further, the robot also comprises a human-computer interaction unit for realizing the communication between the operator and the robot. The human-computer interaction unit in the present embodiment may specifically be a display screen, touch buttons, audible and/or visual prompt alarm lights, etc., thereby realizing the information interaction between the sampling robot and the operator.

Further, the sensing module specifically comprises at least one of the following devices: lidar, obstacle avoidance ultrasonic array, laser sensor array, infrared ranging sensor and 3D camera.

In the present embodiment, the obstacles are detected by lidar and obstacle avoidance ultrasonic array, which will provide the obstacle information obtained in real time, and makes the travel path of the sampling robot more accurate and safe.

Further, the robot also comprises a communication module 50 for performing information communication with a remote management center.

In the present embodiment the robot also comprises the communication module for realizing the information interaction between the robot and the remote management center. The remote management center sends the destination information and sample declaration information to the robot, and the robot sends the sample information detected and video data collected to the remote management center for storage and further analysis.

Figure 2:
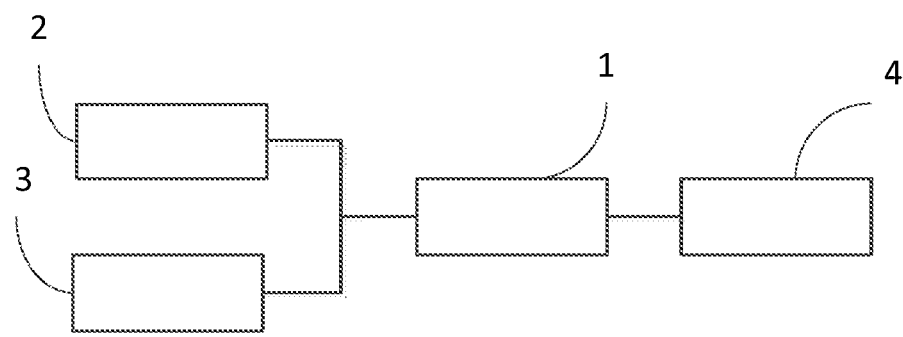
FIG. 2 is a schematic diagram of the structure of a robot system for sampling and detection in the present embodiment.

As shown in FIG. 2, the present embodiment also provides a robot system for goods sampling and detection. The robot system comprises the robot 1 and the remote management center 2.

The remote management center 2 is for receiving information from the communication module of the robot 1 and sending declaration information to the robot 1. The remote management center 2 also sends at least one of the following two kinds of information to the robot 1: the biometric information of the operator with operation authority and the destination information.

The robot system in the present embodiment comprises the sampling robot and the remote management center. The remote management center sends the destination information and sample declaration information to the robot. The robot sends the sample information detected and the video data collected to the remote management center for storage and further analysis. The robot 1 also receives information and operations from the operator 3, for example, receives destination information, etc.

Further, the robot system also comprises a detection center 4 for receiving a sample from the sampling robot 1 and determining whether viruses, bacteria, additives, harmful gases and parasites in the sample to be detected exceed a threshold.

After the sampling robot 1 in the present embodiment delivers the sample to the detection center 4, the detection center 4 further detects the sample, specifically, detects items that need to be detected regarding viruses, bacteria, additives, etc.

The embodiment also provides a method for sampling and detection using a sampling robot, comprising:
photographing a sample, identifying a type of a sample image collected through an image recognition algorithm, comparing the identified type with declared commodity type, and if consistent, judging that a current sample is a sample to be detected;
collecting biometric information of an operator and determining whether the biometric information of the operator is biometric information of an operator with operation authority;
if the current sample is not the sample to be detected or the operator is not an operator with operation authority, prohibiting the operator by the sampling robot from putting the current sample into the refrigeration unit of the sampling robot;
after the sample is put into the refrigeration unit, saving the sample at a preset temperature by the refrigeration unit; and
by the sampling robot, receiving destination information from a remote management center or the operator, performing path planning according to the destination information and obstacle information, and moving according to a planned path.

The sampling robot provided in the present embodiment can move freely in the workspace. It receives the route information sent by the remote management center (for example, after receiving a sample, the sampling robot needs to send the sample to the corresponding laboratory). The remote management center sends the destination information to the sampling robot. The sampling robot performs path planning and movement according to the destination information and the obstacle information on the path.

After receiving the sample, the sampling robot takes photos of the sample and judges whether the sample is the sample to be detected.

In the process of delivery for inspection by the robot, the sample obtained needs to be stored to prevent damage on the way to the laboratory. The robot is equipped with a freezer, which can store the sample at low temperature. The freezer also has the function of weighing, and can obtain the weight in the freezer in real time and calculate the weight of the sample put into or taken out of the freezer. When the sample is put into the freezer, the weight of the sample is calculated and compared with the weight on the customs declaration form to further identify the sample to prevent abnormal situations such as sample error or replacement. Through the above steps, the sampling robot can automatically identify and weigh the sample, thereby improving the efficiency and the informatization level of inspection management.

At the same time, when the personnel operate the robot to open the freezer and put in or take out the corresponding sample, the identity of the operator needs to be further confirmed. Through biological information comparison, it is determined that the current operator is an operator with operation authority; other people have no right to operate the freezer and cannot put in or take out the sample, thereby further ensuring the safety of sample operation.

The sampling robot also uploads the corresponding data of the samples obtained to the remote management center in time, ensuring the real-time recording of the sample information by the remote management center.

Further, the method also comprises:
by the sampling robot, performing preliminary detection on the sample to judge whether the sample meets goods storage conditions or whether there is a deterioration risk, and if the sample does not meet the goods storage conditions or there is a deterioration risk, by the sampling robot, giving an alarm to the remote management center and/or the operator.

In the present embodiment, the sample is also preliminarily identified by the sampling robot. It is necessary to check the transportation, storage status and quality of the low-temperature sample. Through the detection of the temperature and gas of the low-temperature sample, it is judged whether the low-temperature sample storage environment meets the requirements and whether the quality is sound. If there is a risk, the sampling robot gives an alarm to the remote management center and the operator so that the remote management center and the operator can fully understand the situation of the sample.

The above are only the description of preferable embodiments and technical principles used in the present application. Any person skilled in the art should understand that the invention scope of the present application is not limited to the technical solutions formed by the specific combinations of the above technical features, but also includes other technical solutions formed by arbitrary combinations of the above technical features or their equivalent features without departing from the inventive concept, for example, the technical solution formed by replacing the above features with technical features having similar functions disclosed in the present application (but not limited to them). The various aspects and embodiments disclosed herein are for purposes of illustration and are not intended to be limiting, with the true scope and spirit being indicated by the following claims.

What is claimed is:

1. A robot, comprising:
a controller;
an image sensor configured to capturing an image of a sample and send the image to the controller;
a refrigerator configured to be opened to receive the sample and to store the sample at a preset temperature;
a biometric information reader configured to collect biometric information of an operator and send the biometric information to the controller;
a sensor configured to obtain obstacle information;
wherein the controller is configured to receive destination information from a remote management center or the operator, perform path planning according to the destination information and the obstacle information, and cause the robot to move according to a planned path; and
wherein the controller is configured to determine whether the sample is expected based on the image, determine whether the operator has operation authority based on the biometric information, and prohibit the operator from opening the refrigerator in response to that the sample is not expected or the operator has no operation authority.

2. The robot according to claim 1, further comprising: a detector configured to determine whether the sample has a deterioration risk.

3. The robot according to claim 2, wherein the detector comprises:
a temperature sensor configured to measure a temperature of the sample, determine whether the temperature is within a preset threshold; and
a gas sensor configured to detect gas from the sample.

4. The robot according to claim 1, wherein the refrigerator comprises:
a freezer;
a scale configured to weight the sample.

5. The robot according to claim 1, wherein the image sensor is configured to photograph actions of the operator and send the actions to the controller.

6. The robot according to claim 1, wherein the sensor comprises a device selected from a group consisting of: lidar, obstacle avoidance ultrasonic array, laser sensor array, infrared ranging sensor, 3D camera and any combinations thereof.

7. The robot according to claim 1, further comprising: a communication module for performing information communication with a remote management center.

8. A system, comprising: the robot according to claim 1 and a remote management center,
wherein the remote management center is configured to receive information from the robot and send declaration information to the robot, and send to the biometric information of an authorized operator, the destination information, or both.

9. The system according to claim 8, further comprising: a detection center configured to receive the sample from the robot and determine whether viruses, bacteria, additives, harmful gases and parasites in the sample exceed a threshold.

10. A method of using a robot, comprising:
capturing an image of a sample, determining whether the sample is expected based on the image;
collecting biometric information of an operator and determining whether the operator has operation authority based on the biometric information;
prohibiting the operator from opening a refrigerator of the robot in response to that the sample is not expected or the operator has no operation authority;
and
receiving destination information from a remote management center or the operator, performing path planning according to the destination information and obstacle information, and moving the robot according to a planned path.

11. The method according to claim 10, further comprising:
giving an alarm to a remote management center and/or the operator in response to the sample having a deterioration risk.

* * * * *